Dec. 29, 1925.   1,567,736
C. T. HOWSON
CORN HUSKING MACHINE
Filed April 17, 1920   6 Sheets-Sheet 1

Fig. 1.

Witness
J. J. Obirst.

Charles T. Howson, Inventor.
By Emil Kenhart
Attorney.

Dec. 29, 1925.

C. T. HOWSON 1,567,736

CORN HUSKING MACHINE

Filed April 17, 1920        6 Sheets-Sheet 2

Witness:
J. J. Oberst.

Charles T. Howson, Inventor.
By Emil Kunhart
Attorney.

Dec. 29, 1925.

C. T. HOWSON

CORN HUSKING MACHINE

Filed April 17, 1920      6 Sheets-Sheet 3

Charles T. Howson, Inventor.
By Emil Kenhart
Attorney.

Witness:
J. J. Obrist.

Dec. 29, 1925.

C. T. HOWSON

CORN HUSKING MACHINE

Filed April 17, 1920 — 6 Sheets-Sheet 4

Witness:
J. J. Oberst.

Charles T. Howson, Inventor.
By Emil Kenhart
Attorney.

Dec. 29, 1925.  1,567,736
C. T. HOWSON
CORN HUSKING MACHINE
Filed April 17, 1920   6 Sheets-Sheet 5

Charles T. Howson, Inventor.
By Emil Kenhart, Attorney.

Witness:
J. J. Obrist

Dec. 29, 1925.
C. T. HOWSON
CORN HUSKING MACHINE
Filed April 17, 1920
1,567,736
6 Sheets-Sheet 6

Witness:
J. J. Obrst

Charles T. Howson, Inventor.
By Emil Keuhart
Attorney.

Patented Dec. 29, 1925.

1,567,736

UNITED STATES PATENT OFFICE.

CHARLES T. HOWSON, OF SILVER CREEK, NEW YORK.

CORN-HUSKING MACHINE.

Application filed April 17, 1920. Serial No. 374,682.

*To all whom it may concern:*

Be it known that I, CHARLES T. HOWSON, a citizen of the United States, residing at Silver Creek, in the county of Chautauqua and State of New York, have invented certain new and useful Improvements in Corn-Husking Machines, of which the following is a specification.

My invention relates to improvements in corn husking machines, and it has for one of its objects to provide a machine with feeding mechanism and husking mechanism, with the feeding mechanism in a higher plane than the husking mechanism, and with means between the two so that the ears of corn carried along the feeding mechanism will be given a quarter turn lengthwise and reach the husking mechanism at right angles to the ears of corn carried forward by the feeding mechanism.

Other objects are, to provide improved husking mechanism and to so agitate the husking mechanism that the husked ears of corn will be assured a positive delivery from the delivery or tail end thereof and thus prevent clogging of the machine; and to otherwise improve on corn husking machines now in use.

With these and other objects in view, the invention consists in the novel features of construction and in the combination of mechanisms and parts to be hereinafter described and more particularly pointed out in the subjoined claims.

The machine has a suitable frame 20 comprising two connected side members 21, 22, and for convenience in casting and in shipping, each side member is formed in two parts 23, 24, the parts 23 being bolted or otherwise secured to the upper edges of the parts 24 at one end thereof, as at 25. The parts 23 of the side members may be termed the upper frame part, the parts 24 may be termed the lower frame part. The upper frame part overhangs one end of the lower frame part. In addition to the side members 21, 22 of the frame, tie bolts 26 are included in the frame structure, and by means of these bolts and various other parts of the structure the side members are held in proper spaced relation and tied rigidly together.

Figure 6:
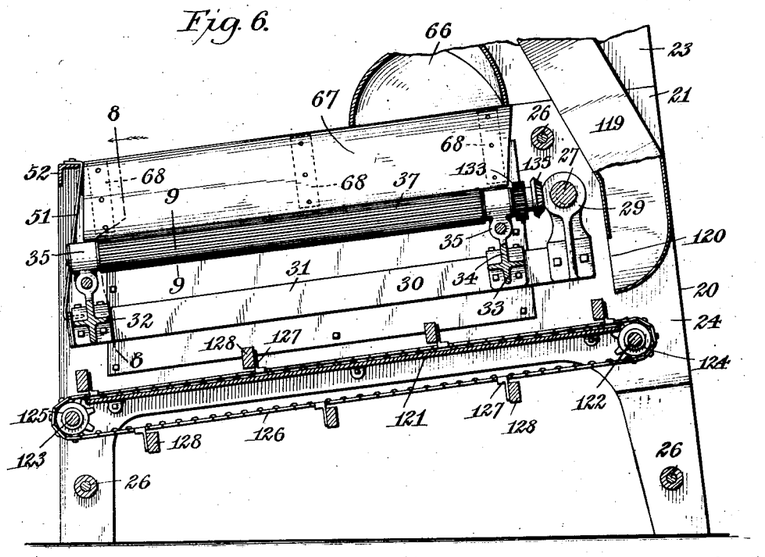
Fig. 6 is a longitudinal section taken on line 6—6, Fig. 7.
Figure 7:
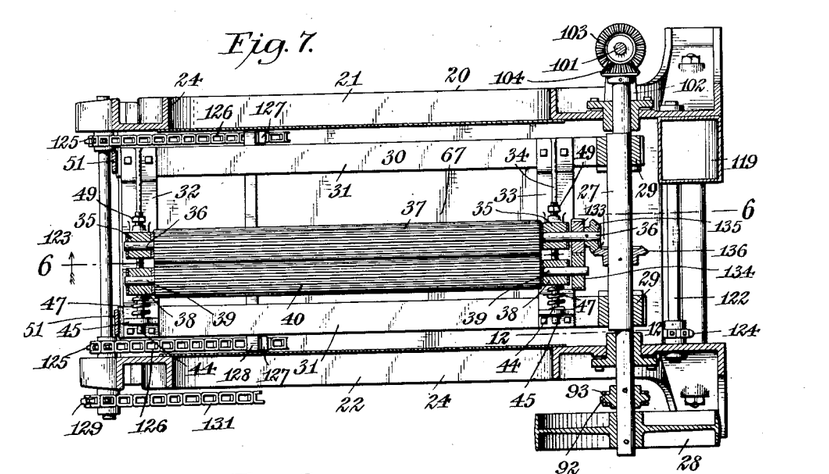
Fig. 7 is a substantially horizontal section taken on line 7—7, Fig. 1.
Figures 10, 11, 12:
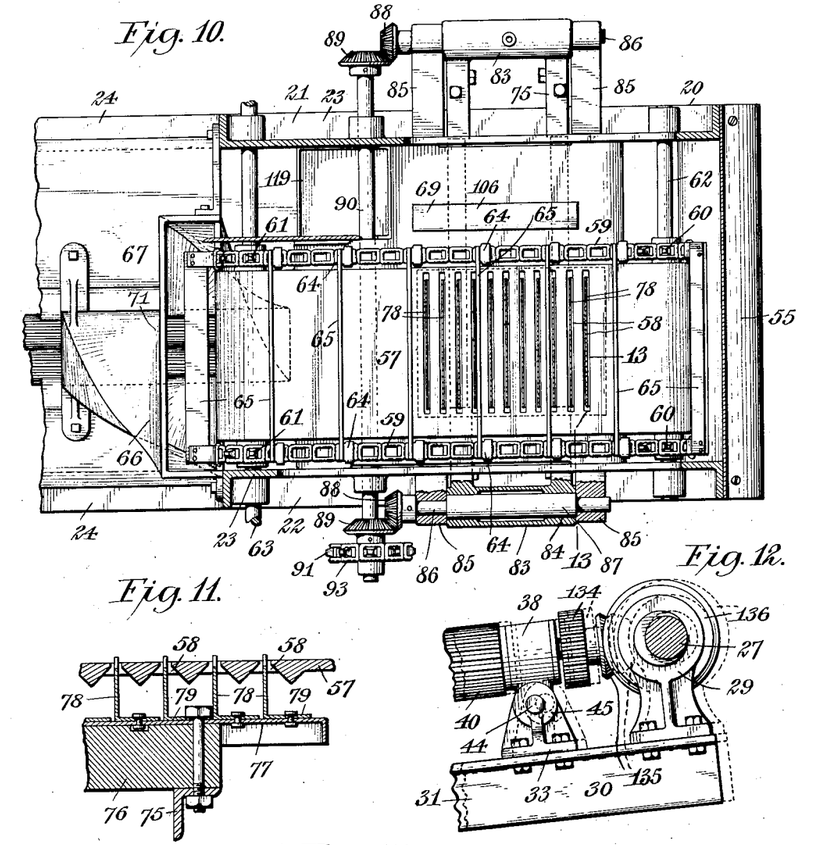
Fig. 10 is a substantially horizontal section taken on line 10—10, Fig. 1.
Fig. 11 is a longitudinal section through a portion of the positioning or placing mechanism.
Fig. 12 is an enlarged longitudinal section taken on line 12—12, Fig. 7.

As there are various revoluble parts employed in this husking machine, I mount a main or driving shaft 27 in the lower frame parts 24 near one end thereof, and to this shaft a driving pulley 28 is secured. The journal portions of this shaft are eccentric to the intermediate portion thereof, as clearly shown in Figs. 6, 7 and 12, and the intermediate portion thereof is passed through bearings 29 secured to what I term a husking frame 30 arranged between the lower frame parts 24 of the frame. This husking frame comprises two side bars 31 spaced apart and connected at one of their ends by a transverse member 32, and near their other ends by a transverse member 33, best shown in Fig. 7. Each of these transverse members has a vertical web 34, and integral with said web and projecting upwardly therefrom is a fixed shaft bearing 35. In the bearings 35 the shaft ends 36 of a longitudinally ribbed husking roll 37 are journaled.

An adjustable bearing 38 is positioned near each of the bearings 35, and in these adjustable bearings the shaft ends 39 of a second husking roll 40 are journaled, said second husking roll being also ribbed longitudinally and arranged alongside the first-mentioned husking roll in such a manner that the ribs of one will enter the spaces between the ribs of the other, the rolls being so positioned, however, that they are practically out of physical contact with each other.

The forward shaft ends 36, 39 of the husking rolls 37, 40 have meshing spur gears 133, 134, respectively, secured thereto and on the forward shaft end of the fixed roll adjacent the spur gear 133 is a bevel gear 135 which meshes with a bevel gear 136 fastened to the enlarged eccentric intermediate portion of the main or driving shaft 27.

Each of the adjustable bearings 38 has a depending portion 41 forked at its lower extremity, as at 42, to straddle the web 34 of the cross member 32. A set screw 43 passes through each arm of the bifurcated portion 42 and bears against said web to secure a snug sliding fit of said adjustable bearing on said cross member and to permit of properly alining said bearing with the fixed bearing 35 at the same end of the husking frame. The bearings 35 and 38 at each end of the husking frame are provided with alined transverse openings, the opening in the adjustable bearing 38 being larger than the opening in the fixed bearing and being also threaded to receive the threaded portion of an adjusting rod 44 rotatable in a guide lug 45 extending upwardly from the cross members 32 or 33, as the case may be. The said adjusting rods are each provided with a reduced portion 46 slidably arranged within the opening of a fixed bearing 35, said reduced portion providing a shoulder on said rod which bears against that side of the bearing facing the adjustable bearing.

Surrounding each of said adjusting rods between its guide lug 45 and the adjustable bearing, with opposite ends in contact with such parts, is a spiral spring 47 exerting force against the adjustable bearing to retain the husking roll 40, journaled in the adjustable bearings, in proper position with respect to the husking roll 37 journaled in the fixed bearings 35. In order to assure this relation of the husking rolls under normal conditions, a nut 48 is threaded onto said adjusting rod and tightened against the side of the adjustable bearing 47, thereby retaining the adjustable bearing in the desired position with respect to the shoulder on the rod. When the spring exerts its pressure against the adjustable bearing, said shoulder is brought in contact with the fixed bearing and serves as a stop to prevent the adjustable roll from coming into physical contact with the fixed roll. The spiral springs 47 also serve to permit separation of the rolls during the operation of the machine, but to limit this separating movement, the reduced portion of each adjusting rod 44 has its extremity threaded and extended through a fixed bearing 35 and onto said threaded extremity a nut 49 is applied, said nut being adjustably positioned the desired distance from the fixed bearing so that when the rolls separate, the adjusting rods slide in the fixed bearings 35 and in the guide lugs 45 until the nuts 49 come in contact with the fixed bearing and prevents further sliding movement.

Each of the adjustable rods 44 is provided with a transverse opening 50 through which a pin may be passed when it is desired to rotate the rod in order to adjust the bearing 38 thereon, but it is apparent that the rod may be provided with other means for conveniently rotating the same. The husker frame and the husker rolls rotatably mounted thereon are inclined from the driving shaft toward the opposite end of the machine, and the tail end of said frame is supported by springs 51 secured at their upper ends to a cross bar 52 connecting the side members 21, 22 of the frame and at their lower ends to the transverse member 32 of the husking frame.

It is to be noted that these springs are arranged at an acute angle to the husker frame or, in other words, directed from their upper ends downwardly and rearwardly for a purpose to appear hereinafter.

Secured to the upper edges of the side members 21, 22 of the frame is a receiving table 53 onto which the ears of corn are to be delivered from a hopper, bin or other suitable means, and at the front end of this table a rearwardly and downwardly inclined chute 54 is provided. The front end of the overhanging portion of the frame is closed by a wall 55 conforming in shape to the formation of the ends of the frame, and this wall is extended upwardly a distance above the chute, as at 56, to serve as a stop or abutment for the ears of corn drawn from the table 53 into the chute 54. Between the two upper parts 23 of the side members 21, 22, a feed table 57 is arranged, this table being fastened to said parts 23 and having transverse slots 58 formed therein, with the material of the table between said slots of substantially V-formation in cross section. This table extends from a suitable point beneath the chute 54 to the extreme rear ends of the upper parts 23 of the side members 21, 22.

Figure 3:
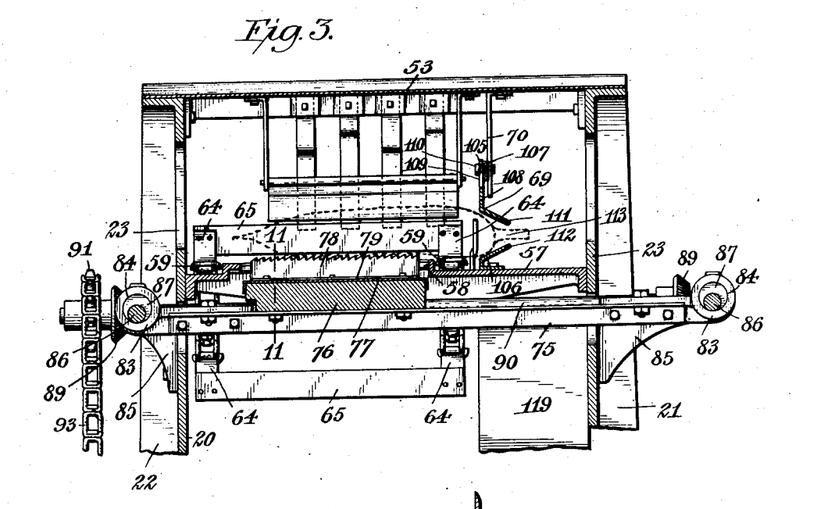
Fig. 3 is an enlarged transverse vertical section taken on line 3—3, Fig. 2.
Figure 4:
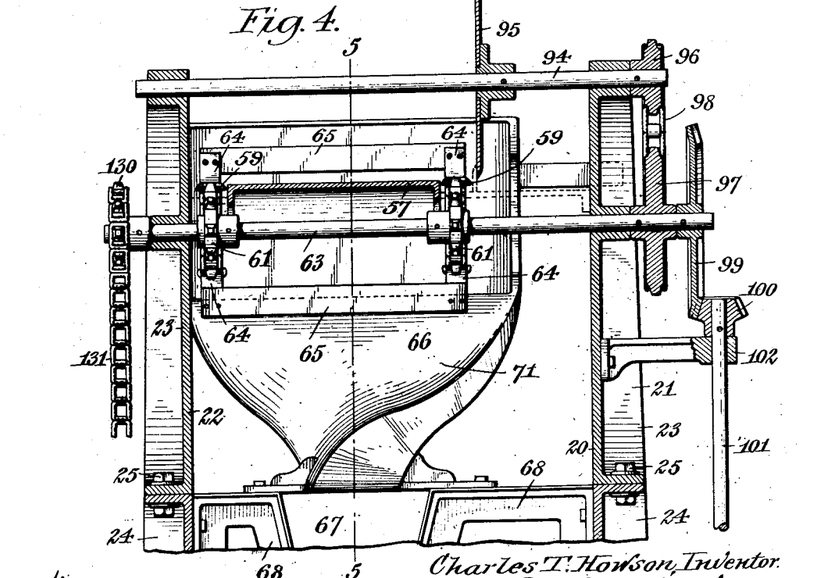
Fig. 4 is an enlarged transverse substantially vertical section taken on line 4—4, Fig. 2.
Figure 5:
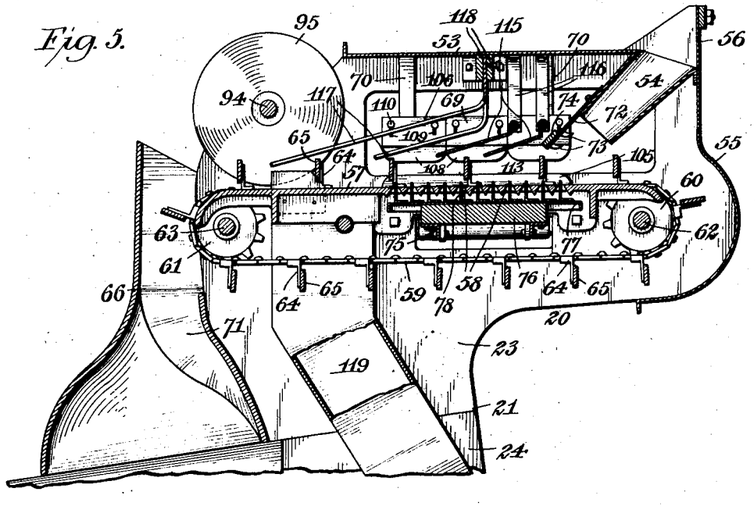
Fig. 5 is a vertical longitudinal section through the upper end of the machine taken on line 5—5, Fig. 4.

As clearly shown in Fig. 3, this table has an elevated portion between its side edges, and in this elevated portion, which is continued from front to rear of the table, the transverse slots 58 are arranged. Said slots, however, extend only along a portion of the length of this elevated portion, as best shown in Fig. 5.

59 designates two endless chains which pass around sprocket wheels 60, 61 fastened to transversely-disposed shafts 62, 63, the sprocket wheels 60 being spaced apart on the shaft 62 and the sprocket wheels 61 being spaced apart on the shaft 63, each sprocket wheel 60 being in longitudinal alinement with a sprocket wheel 61 and the sprocket wheels so alined serve as two pairs of wheels around which the sprocket chains 59 travel. These sprocket chains are arranged in planes at opposite sides of the elevated portion of the table 57, and at regular intervals each chain is provided with brackets or outwardly directed lugs 64, the lugs of opposite sprocket chains being paired and having transverse lugs or bars 61 secured thereto, said lugs or bars traveling over said table 57 in a rearward direction while spaced a short distance therefrom, and traveling beneath said table in a forward direction at a somewhat greater distance therefrom.

Figure 8:
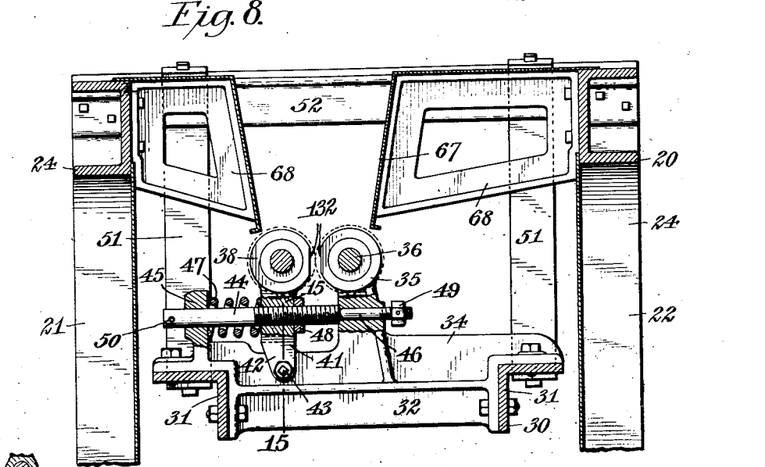
Fig. 8 is a transverse substantially vertical section taken on line 8—8, Fig. 6.
Figure 9:
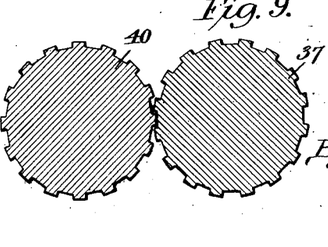
Fig. 9 is a section through the husking rolls taken on line 9—9, Fig. 6.

The chains and lugs or bars may be termed an "endless feeding device", which is adapted to cause the ears of corn, delivered onto the feed table 57 from the chute 54, to be moved rearwardly over said table and be delivered from the rear end of the same into a delivery chute 66 directed downwardly and terminating in a receiving hopper 67 arranged above the front ends of the husking rolls 37, 40, said hopper being formed by securing suitable castings 68 in the form of brackets to the inner sides of the lower members 19 of the frame, as best shown in Fig. 8, and securing sheet metal members thereto which serve as hopper walls.

The ears of corn delivered onto the receiving table 53 are directed into the chute 54 by an operator stationed at the front end of the machine, and while directing the ears of corn into the chute, they are all positioned with their butts to the right. When thus positioned they gravitate through the chute 54 and are delivered onto the feed table 57, being drawn rearwardly by the endless feeding device 59. By means of suitable placer mechanism, to be presently described, the ears of corn are all moved toward the right and retained against a gage or guide 69, which receives support from hangers 70 fastened to the upper or receiving table 53. The ears of corn are therefore delivered from the feed table 57 into the chute 66, while in a tranverse position. The upper end of said chute 66 is elongated transversely and given a quarter turn, as at 71, between its ends with the lower end thereof elongated in a longitudinal direction. The ears of corn are therefore delivered into the hopper 67 and onto the husking rolls while positioned longitudinally.

With a view of assuring the delivery of a single ear of corn at a time onto the feeder table 57, a gate 72 is hinged to the rear wall of the chute 54, and it is provided with means to create friction against the gravitating ears of corn or with means to engage the corn in such a manner as to assure retention of all of the ears of corn in the chute except one. In preferred form this gate has on its front face a number of upwardly curved prongs 73 and to its rear face a metallic bar or other element 74 is secured to furnish the proper weight to keep said gate in its normal position.

It will be noticed, therefore, that with this retarding or regulating means, as it may be termed, provided at the lower end of the chute 54, one ear of corn will be delivered between the adjoining bars or lugs 65 of the feeding device as they travel underneath the chute, and with an ear of corn in each space between said bars or lugs, a continuous feed of corn is assured.

Figure 13:
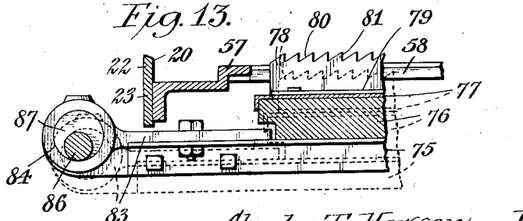
Fig. 13 is an enlarged transverse section taken on or about line 13—13, Fig. 10, with the feed chain omitted.
Figure 15:
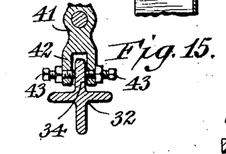
Fig. 15 is a vertical section taken on line 15—15, Fig. 8.

Associated with the feed table 57 and co-acting with the transverse slots 58 therein is what I term placer mechanism comprising a transversely-disposed frame 75 having two spaced bars to which a flat wooden member 76 is bolted or otherwise secured and on said wooden member a plate of sheet metal 77 is fastened with the marginal portions thereof bent over the side edges of the wooden member. At opposite ends this plate overhangs the wooden member, as shown in Fig. 5. Fastened to the upper surface of the plate 77 are a series of transversely-disposed toothed upstanding blades 78, which are angular in cross section to provide securing webs 79 along their lower portions to enable them to be fastened to the plate 77. The teeth of these blades are at their upper edges, each tooth having an inclined portion 80 and an abrupt vertical portion 81, see Fig. 13, the abrupt vertical portions facing toward the guide or gage 69.

Figure 1:
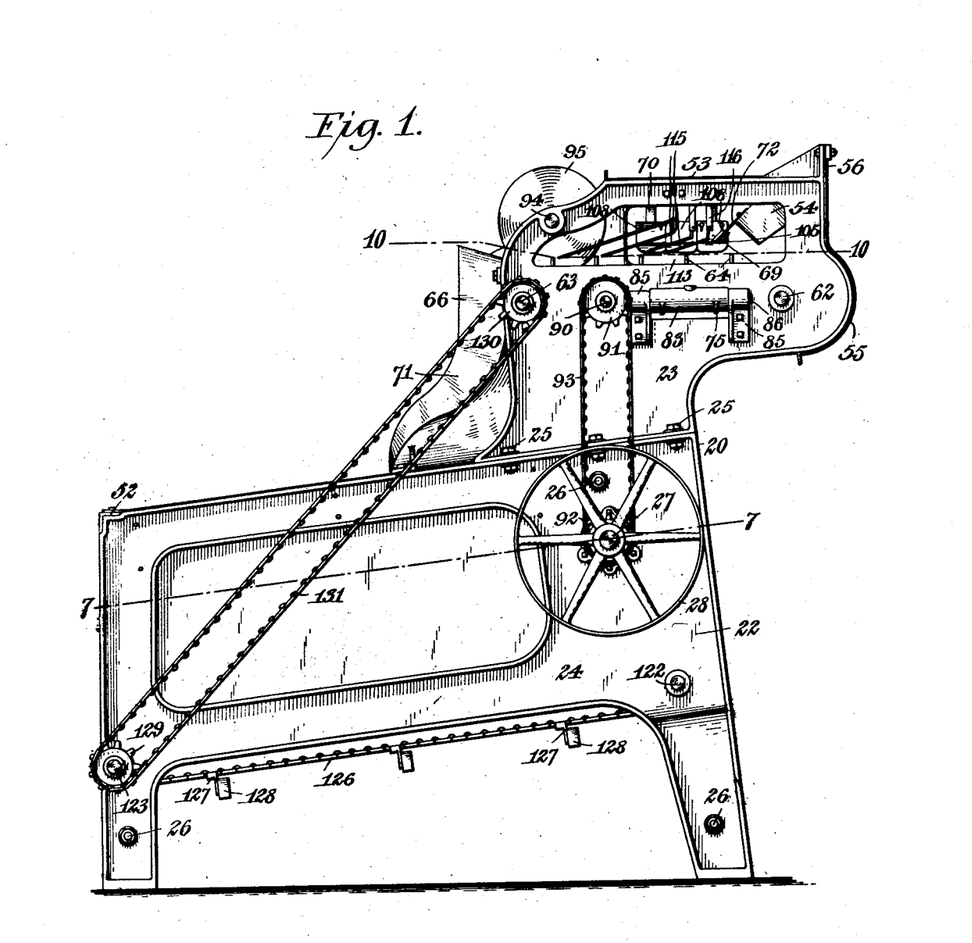
Figs. 1 and 2 are opposite side views of the machine.

Connecting corresponding ends of the spaced bars of the frame 75 and forming part of said frame are castings 83, each casting being provided with a circular bore 84, and fastened to the frame of the machine at opposite ends of each casting 83 are brackets 85 in which a shaft 86 is journaled, each shaft having an eccentric intermediate portion 87, preferably somewhat larger than the end portions thereof journaled in the brackets 85. To the rear end of each of the shafts 86, a bevel gear 88 is secured, and these bevel gears mesh with bevel gears 89 fastened to a transverse shaft 90 suitably journaled in the frame of the machine. To one end of the shaft 90 a sprocket wheel 91 is keyed or otherwise fastened, and passing around this sprocket wheel and a sprocket wheel 92 on the main shaft 27 is a sprocket belt 93 (see Fig. 1). The shaft 90 is therefore driven directly from the main shaft 27 and through the medium of the bevel gears 89 and 88 imparts motion to the eccentric shafts 86, thus imparting to the placer mechanism a combined transversely reciprocating and vertical or shaking movement which causes the toothed blades to move transversely and at the same time up and down to project the teeth above the upper surface of the feed table 57 while moving toward the gage or guide 69, and to withdraw said blades so as to cause the teeth to recede while the blades move away from said gage or guide. In this manner the corn being forced over the feed table 57 by the endless feeding device is moved into contact with the gage or guide 69 and maintained in such position with the butts of the ears properly positioned to be severed from the remainder of the ear, and with any stalks that may be on the ears projecting beyond said gage or guide.

Figures 2, 14:
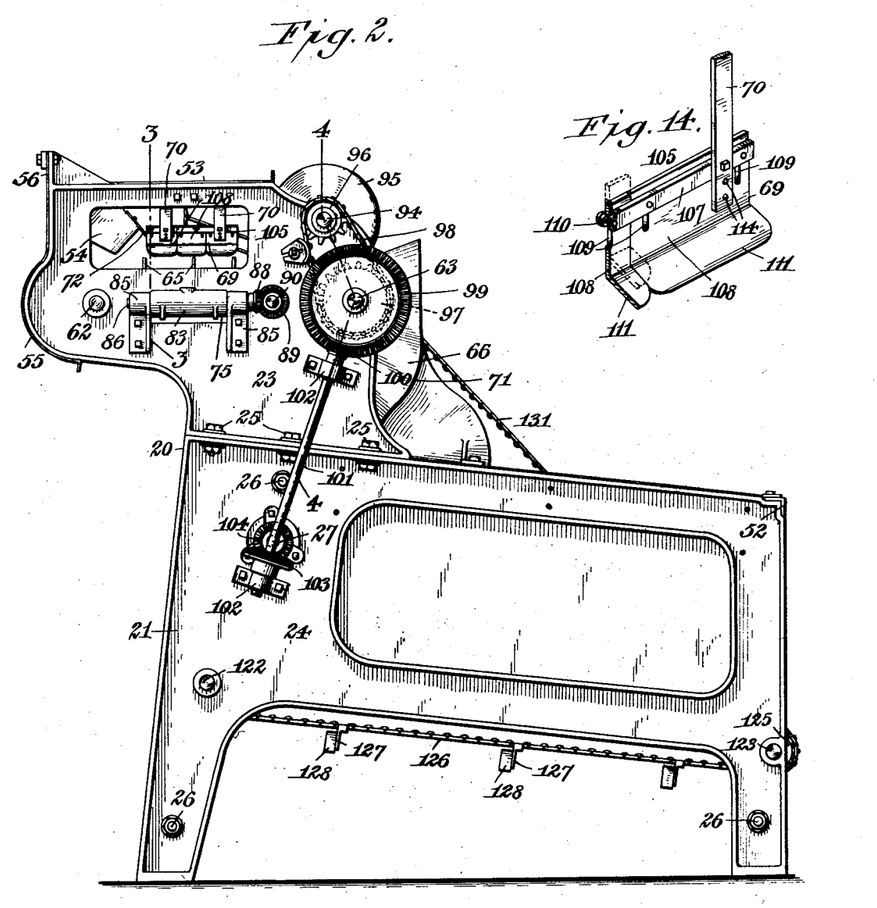
Fig. 14 is a sectional perspective view of the upper part of the yielding guide.

Arranged transversely and journaled in the upper parts 23 of the side members 21, 22 is a shaft 94 and fastened to this shaft is a rotatable knife or cutter 95 by means of which the butts of the ears of corn are severed from the remainder of the ears. To one end of the shaft 94 a sprocket wheel 96 is secured, and passing around this sprocket wheel and a second sprocket wheel 97 secured to the shaft 63 is a sprocket belt 98. On the shaft 63 adjacent the sprocket wheel 97 a bevel gear 99 is secured, and meshing with this bevel gear is a comparatively small bevel gear 100 fastened to the upper end of a shaft 101 journaled in bearings 102 secured to the upper and lower members of the frame at one side of the machine (see Fig. 2). At or near its lower end a bevel gear 103 is secured and this gear is in mesh with a bevel gear 104 fastened to the main or drive shaft 27.

The endless feeding device is therefore driven from the main shaft 27 through the medium of the bevel gears 104, 103, shaft 101, bevel gears 100, 99, and shaft 63, and the rotating knife or cutter is driven from the shaft 63 through the medium of the sprocket wheel 97 on said shaft, sprocket belt 98, and sprocket wheel 96 on the shaft 94 of said knife or cutter. The shaft 94, knife or cutter 95 and means directly rotating the shaft, or operative parts thereof, may be termed "butting" mechanism.

As clearly shown in Fig. 3 of the drawings, the gage or guide 69 comprises an upper section 105 and a lower section 106, the upper section comprising a longitudinal bar 107 fastened to the supports or hangers 70 and a plurality of abutting plates 108 having vertical slots 109 therein through which screw bolts or other sustaining means 110 projecting from the longitudinal bar are passed, the lower portion of each plate 108 being inclined downwardly and outwardly, as at 111. The lower section comprises a single plate secured to the feed table 57 and having its upper portion directed outwardly and upwardly, as at 112, the extremities of the two portions 111 and 112 of said gage or guide being spaced apart, as at 113. The two inclined portions 111, 112 provide an outwardly restricted guide way into which the butts of the ears of corn are forced by the placer mechanism, as shown in dotted lines in Fig. 3, and if an ear of corn still has a portion of a stalk thereon the stalk may extend out through the space 113.

Each of the supports or hangers 70 may be provided with a plurality of bolt holes 114 arranged in vertical alinement (see Fig. 14) so that the longitudinal bars supporting the sections of the upper section 105 of the gage or guide may be fastened at different heights and the sections of the gage or guide therefore adjusted to accommodate different runs of corn gaged by size, depending upon the locality in which it is grown. Regardless of the size of the general run of corn grown in any locality, it will be found that some of the ears are of greater diameter than others, and by having the upper section of the gage or guide made sectional, one section will assume a different position than another when the ears of corn in contact therewith are of different sizes, and consequently a small ear may immediately follow a larger ear with full assurance that the gage or guide will properly hold the ears in place while traveling rearward along the feed table 57.

Extending transversely above the feed table and directly in rear of the regulating gate 72 are pivoted presser plates 115, the pivots of these presser plates being journaled in hangers 116 at opposite sides of the machine. In rear of said presser plates a plurality of flexible presser elements in the form of presser springs 117 are provided, said springs being inclined downwardly and rearwardly from their front ends and having at their front ends upwardly directed portions fastened between transverse bars 118, or otherwise. The pivoted presser plates 115 and the presser springs 117 act against the ears of corn positioned between the transverse lugs or bars 65 of the feeding device and hold said ears in proper position so as to bring the butts thereof against the rotating knife or cutter 95. The butts are severed from the remainder of the ears of corn and delivered into a chute 119 opening at its upper end adjacent said knife or cutter. Said chute is directed downwardly and terminates in advance of the husking frame 30, and it has a discharge 120 at the lower end of its rear wall.

Arranged underneath the husking mechanism is a rearwardly inclined discharge table 121, and at opposite ends of said table are transverse shafts 122, 123 journaled in the sides of the frame. On the shaft 122 are sprocket wheels 124, and similar sprocket wheels 125 are secured to the shaft 123, the sprocket wheels at each side of the frame being paired and around each pair of sprocket wheels a sprocket belt 126 is arranged to travel, certain links of said sprocket belts having outstanding lugs or arms 127 to which lugs or cross bars 128 are secured. The sprocket belts 126, the parts carried thereby and the parts around which said chains travel constitute discharge mechanism for waste. The butts and stalks cut from the ears of corn by the rotating knife or cutter 95 and delivered through the chute 119 are deposited upon the rear end of the table 121 and carried forward along said table by the transverse bars or lugs 128, being delivered from the rear or tail end of the table into suitable receptacles or otherwise.

To one end of shaft 123, a sprocket wheel 129 is secured, around which and at sprocket wheel 120 on the corresponding end of shaft 63 a sprocket belt 131 travels. The shaft 63 is rotated from the main shaft 27, as hereinbefore described, and in turn operates the feeding mechanism, the cutting or "butting" mechanism and the discharge mechanism.

Attention is invited to the fact that the bearings 35 and 38 at the rear end of the husking rolls 37 and 40 are provided with cut-away portions 132, thus forming a delivery space between them. Husks that may be carried rearward and be wedged between the rolls at their rear ends will have a free escape rearwardly through the delivery space so formed and thus prevent clogging of the machine.

The operation of the device is as follows:

The ears of corn delivered onto the receiving table 53 are drawn rearwardly by an operator stationed at the front of the machine, and as these ears are drawn forwardly, they are positioned with the butts at the same side of the machine, in the particular machine shown in the drawings, the ears would be positioned with the butts to the right to allow them to pass downwardly through the chute 54. The ears are engaged one at a time by the regulating means 72 so that the ears are delivered successively to the spaces between the lugs or transverse bars 61 of the feeding device, with the butts of the ears to the right. In this manner the ears of corn are advanced through the machine broadside forward, by which I mean that the longitudinal axes of the corn are at right angles to the direction of advancement.

While the ears of corn are traveling rearwardly, they are engaged by the toothed blades of the placer mechanism and forced laterally into position with respect to the gage or guide 69, the toothed blades acting to retain the ears in such position. At the same time the pivoted presser plates 115 bear down upon the ears of corn, and as the corn leaves the gage or guide and passes over the placer mechanism, it is retained in position by the presser springs 117. While so retained the ears are brought into contact with the butting mechanism, and more particularly with the peripheral edge of the rotatable knife or cutter 95, and the butts with the stalks, if any thereon, are severed from the remainder of the ears, the butts entering the upper open end of the chute 119, and by it being directed to the discharge table 121, from which it is carried along the inclination of said table to the tail end of the machine to be discharged therefrom and into any suitable receptacle, or to suitable conveyer means, if desired, situated to carry the butts and stalks away from the machine. The ears of corn with the butts removed continue on their course disposed in transverse position and are delivered from the feeding device into the upper end of the chute 66. In passing through this chute, the ears of corn are given a quarter turn lengthwise and are delivered from the lower end of the chute at a right angle to the position in which they entered the same, or in other words, parallel with the husking rolls. The husks of the ears of corn are gripped and removed by the longitudinal ribs of the husking rolls, and the husks thus removed from the ears are carried down through the rolls, dropping onto the discharge table 121, from which it is removed with the butts and stalks of the ears of corn.

While in contact with the husking rolls, the ears of corn travel downwardly along the inclined rolls, but to assist in this and assure free movement along the rolls, the eccentric portion of the main shaft causes actuation of the husking frame. This frame is given an oscillating or shaking movement, and due to the fact that the rear end thereof is supported by the springs 51 and said springs are inclined rearwardly toward their lower end, said rear end is given a slight upward kick or jumping motion which guards against the retention of the ears on the rolls and assures a quick and free delivery from the rear ends thereof.

Having thus described my invention, what I claim is:—

1. A corn husking machine comprising feeding mechanism by means of which ears of corn are transversely fed, husking mechanism beneath said feeding mechanism and in the path of the corn passing through said machine, and a chute at corresponding ends of said feeding and husking mechanisms receiving the ears of corn from said feeding mechanism while transversely fed and giving said ears a quarter turn to deliver the same longitudinally to said husking mechanism.

2. A husking machine comprising feeding mechanism for feeding ears of corn transversely, husking mechanism in a plane beneath said feeding mechanism, and a twisted chute delivering the ears of corn from said feeding mechanism to said husking mechanism, said ears of corn being delivered lengthwise out of said chute.

3. A corn husking machine having longitudinally-disposed feeding mechanism for feeding transversely-disposed ears of corn, husking mechanism in a plane beneath said feeding mechanism, husk discharge mechanism in a plane beneath said husking mechanism, and a chute receiving the transversely-disposed ears of corn from said feeding mechanism and delivering said ears of corn from said feeding mechanism longitudinally to said husking mechanism.

4. In a corn husking machine, a frame, husking mechanism mounted on said frame, and means for imparting an irregular vibratory motion to said frame.

5. In a corn husking machine, the combination of a longitudinal fixed feed table along which ears of corn are to be delivered while in a transverse position, longitudinal means for feeding the ears of corn along said table, longitudinal husking mechanism underneath said feeding mechanism, and means for turning the corn in its travel between said feeding mechanism and said husking mechanism to deliver the corn to said husking mechanism in a longitudinal position.

6. A corn husker comprising a frame having feeding mechanism, husking mechanism, a main or drive shaft journaled in said frame and serving to operate said husking mechanism, means extending upwardly at one side of the frame from said main shaft to said feeding mechanism for driving the latter, and a twisted chute adapted to receive the ears of corn from said feeding mechanism and deliver the same to said husking mechanism, said chute giving said ears of corn a quarter turn lengthwise to deliver them with their longitudinal axes at right angles to the position of their axes when entering said chute.

7. In a corn husking machine a husking frame, means for imparting a combined longitudinal and vertical movement to said frame from one end thereof, means for yieldingly suspending the other end of said frame to cause said combined longitudinal and vertical movement to be irregular, and a pair of husking rolls inclined in one direction and rotatably mounted on said frame.

8. In a husking machine, a longitudinally-disposed frame having a bearing at one end and being yieldingly suspended at its other end, an eccentric shaft journaled in said bearing, a pair of husking rolls arranged lengthwise on said husking frame and journaled thereon, and means for rotating said rolls in opposite directions.

9. In a husking machine, husking mechanism comprising a frame inclined in one direction and having a bearing at its elevated end, an eccentric shaft journaled in said bearing, a pair of longitudinally-disposed husking rolls correspondingly inclined and journaled on said frame, means for rotating said rolls, and means at the lower end of said frame for suspending the same and causing a sudden jumping motion during each revolution of said eccentric shaft.

10. In a husking machine, husking mechanism comprising a frame inclined in one front to its rear end, a flexible strap supporting said frame at its rear end from an elevated point, said strap being directed downwardly and rearwardly from its highest point, means for imparting to the front end of said frame a combined longitudinal and vertical movement, a pair of inclined husking rolls mounted on said frame, and means for rotating said rolls in opposite directions.

11. In a husking machine, a husking frame having a fixed bearing at each end, a guide lug alined with each fixed bearing, an adjustable bearing between and associated with each guide lug and fixed bearing, an adjusting rod having a reduced portion and slidable in each guide lug and in the fixed bearing alined therewith and threaded through the adjustable bearing therebetween, cushioning means between each guide lug and its associated adjustable bearing, and opposing stops on said adjusting rod to regulate the sliding movement of said rod through said fixed bearing in opposite direction.

12. In a husking machine, a husking frame having an upstanding transversely-disposed web at each end, each web having a fixed guide lug and a fixed bearing rising therefrom and alined therewith, an adjustable bearing between each fixed bearing and its alined guide lug, each adjustable bearing having a bifurcated lower end straddling said web and adjusting bolts passed through the opposite sides of said bifurcated lower end and engaging said web at opposite sides thereof, an adjusting rod guided in each guide lug and fixed bearing alined therewith and threaded through the adjustable bearing therebetween, a nut threaded onto each adjusting rod and bearing against the side of the adjustable bearing facing the fixed bearing in which said rod is guided, a spiral spring surrounding each guide rod and bearing with one end against the co-operating guide lug and with its other end against the side of the co-operating adjustable bearing facing said guide lug, each adjusting rod having a reduced portion to provide a shoulder adapted to normally bear against the side of the fixed bearing facing said adjustable bearing, and a nut threaded onto the extremity of said reduced portion normally spaced from said fixed bearing.

13. In a husking machine, the combination with a main frame, of a shaft journaled in said frame and having an intermediate eccentric portion, a husking frame within said main frame having bearings at one end through which the eccentric portion of said shaft is passed, a pair of husking rolls arranged lengthwise on said frame, a pair of fixed bearings on said frame in which the shaft of one of said rolls is journaled, a pair of adjustable bearings on said frame in which the shaft of the other roll is journaled, a bevel gear on the eccentric portion of said first-mentioned shaft, a bevel gear secured to the shaft of one of said rolls and being in mesh with the bevel gear on the eccentric portion of said first-mentioned shaft, and spur gears on the shafts of said rolls meshing with each other.

14. In a corn husking machine, a frame, a pair of husking rolls rotatably mounted on said frame and inclined in one direction, means at one end of said frame for vibrating the same, and means at the other end of said frame for causing each vibratory movement to include quick and slow portions of movements.

15. In a husking machine the combination with a pair of connected side frame members, brackets extending inwardly from said frame members, longitudinally-disposed hopper walls secured to said brackets and inclined inwardly toward their lower ends, longitudinally-disposed mechanism at the lower end of the space between said hopper walls, feeding mechanism between said frame members in a plane above said hopper walls, and a chute into which ears of corn are delivered from said feeding mechanism, said chute terminating at the upper ends of said hopper walls to deliver the corn thereinto and onto said husking mechanism.

16. A husking machine comprising feeding mechanism, husking mechanism, and means between said mechanisms for turning the ears of corn on centers passing transversely therethrough, said mechanism and means being in the same longitudinal plane.

17. A husking machine comprising feeding mechanism for feeding ears of corn with their longitudinal axes transverse to the feeding movement, husking mechanism beneath said feeding mechanism including a pair of husking rolls whose length is in the direction of said feeding movement and which receive the ears of corn with their axes lengthwise thereto, and means between said feeding mechanism and husking mechanism for turning the ears of corn from the positions they are fed in to that in which they are delivered to said husking mechanism.

18. In a corn husking machine, a frame, husking mechanism on said frame, means at one end of said frame for vibrating the same, and means at the other end of said frame for causing the vibratory movement to be quickened in action at a certain point thereto.

19. In a corn husking machine, a frame, a pair of husking rolls rotatably mounted on said frame and inclined in one direction, means at one end of said frame for vibrating the same, and supporting means for said frame at the other end thereof caused by said vibrating means to impart irregularity to the vibratory movement of said frame.

In testimony whereof I affix my signature.

CHARLES T. HOWSON.